United States Patent [19]
Hirschkoff

[11] 3,934,345
[45] Jan. 27, 1976

[54] SNAP-ACTING OVER-CENTER CHAIN SAW SAFETY BRAKE AND METHOD OF OPERATION THEREOF

[75] Inventor: Sidney Hirschkoff, Los Angeles, Calif.

[73] Assignee: McCulloch Corporation, Los Angeles, Calif.

[22] Filed: Oct. 15, 1974

[21] Appl. No.: 515,046

[52] U.S. Cl. .................... 30/381; 30/383; 188/77 R; 188/166
[51] Int. Cl.[2] .................... B23D 57/02; B27B 17/00
[58] Field of Search ............ 30/381, 383; 188/77 R, 188/166; 192/130, 129 R

[56] References Cited

UNITED STATES PATENTS

| | | | |
|---|---|---|---|
| 3,292,742 | 12/1966 | Thomas | 188/166 |
| 3,739,475 | 6/1973 | Moore | 192/130 |
| 3,776,331 | 12/1973 | Gustafsson | 188/77 R |
| 3,793,727 | 2/1974 | Moore | 192/130 |

*Primary Examiner*—James L. Jones, Jr.
*Attorney, Agent, or Firm*—Burns, Doane, Swecker & Mathis

[57] ABSTRACT

A chain saw safety brake including a snap-acting, over-center actuating mechanism.

A chain saw safety brake and method of operation characterized by an actuation accelerator interposed between a brake mechanism and a brake actuating mechanism. A biasing means is operable to bias the brake actuating means toward a nonactuating position with a relatively lower biasing force. The biasing means is operable to bias the brake actuating means toward an actuating position with a relatively higher biasing force.

8 Claims, 7 Drawing Figures

Figure 1:
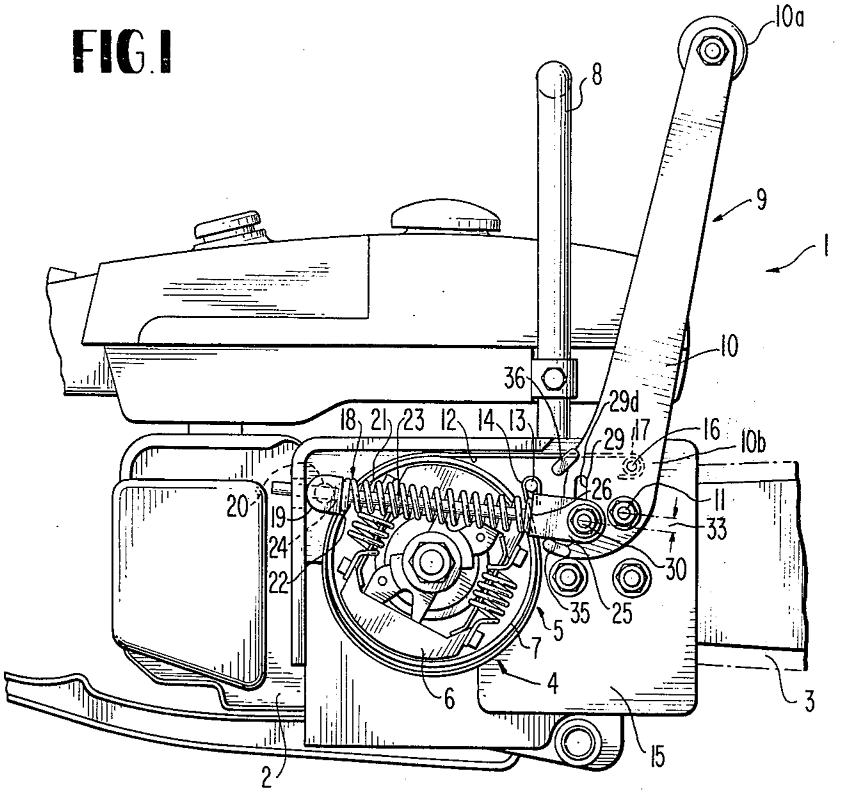

FIG. 7
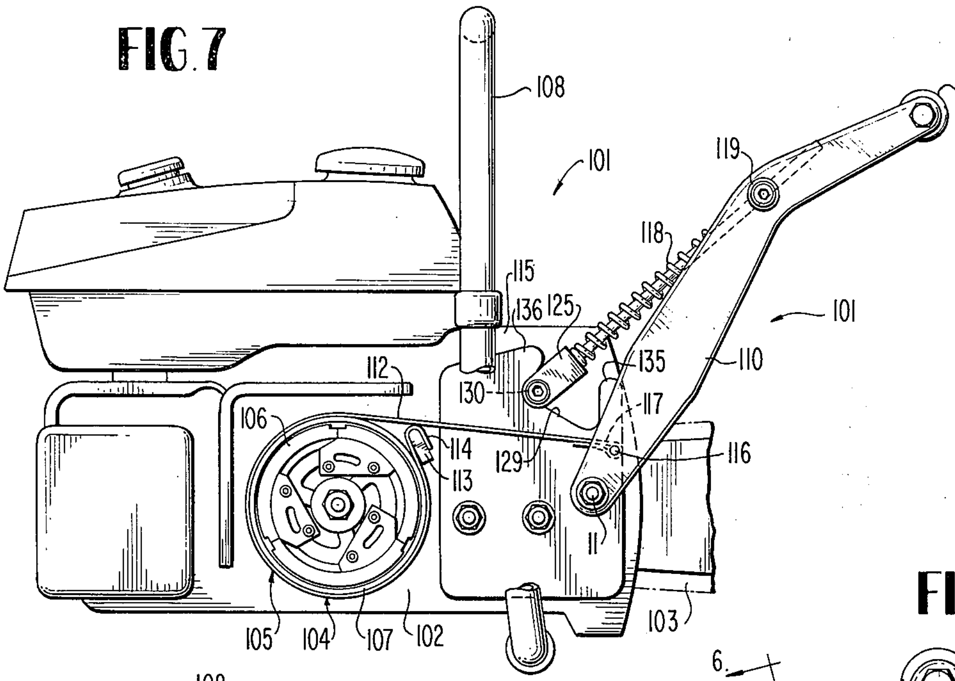
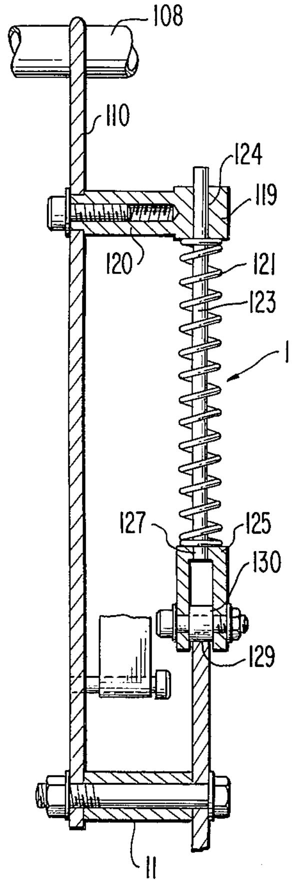
FIG. 6
FIG. 5
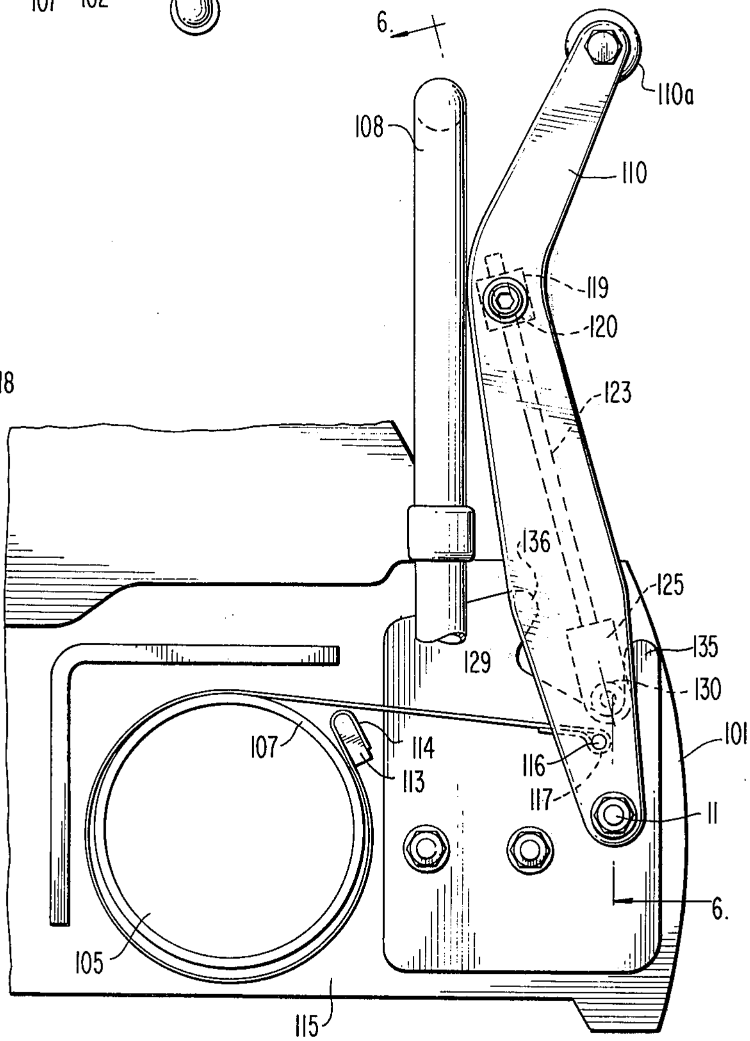

SNAP-ACTING OVER-CENTER CHAIN SAW SAFETY BRAKE AND METHOD OF OPERATION THEREOF

GENERAL BACKGROUND, OBJECTS AND SUMMARY OF INVENTION

With continuing emphasis being placed upon the improvement of safety conditions in relation to the use of chain saws, it has become increasingly important to protect chain saw operators from injuries resulting from "kickbacks" of chain saws or from situations where operators losing their grip on chain saw handles such that their hands are brought into engagement with chain saw cutter chains.

Several techniques have been developed in the past in an endeavor to improve chain saw safety and protect operators from injuries when events such as this occur.

All this notwithstanding, there has persisted in the art a need to improve the efficiency and reliability of such safety mechanisms.

Accordingly, it is a specific object of the present invention to provide a chain saw safety brake which is snap-acting and operated via an accelereating mechanism so as to produce a cutter chain braking action in an extremely rapid manner.

It is a further object of the present invention to accomplish such a rapidity of braking with a minimized movement of an actuating member or safety handle.

Yet another object of the invention is to provide a chain saw safety brake actuating mechanism wherein an intensified biasing force is created when the actuating mechanism is moved to a brake actuating position.

It is likewise an object of the invention to provide such improvements in the art as heretofore described concurrent with the attainment of relative structural simplicity and reliability and the minimization of alterations to conventional chain saw structures.

In accomplishing at least some of these objectives, the present invention contemplates a method of actuating a chain saw safety brake which is characterized as follows.

The method of this invention involves the safety braking of a chain saw which includes a brake means and brake actuating means movably engaged with said brake means. The inventive method entails:

- operably interposing actuation accelerator means between the brake actuating means and the brake means and employing this accelerator means to effect a faster rate of brake actuation than would result from said movable engagement between the brake actuating means and the brake means;
- biasing the brake actuating means toward a nonactuating position with a relatively lower biasing force; and
- biasing the brake actuating means toward an actuating position with a relatively higher biasing force.

Likewise, the invention contemplates unique combinations of apparatus means which coact to effect the method steps heretofore described.

Moreover, the invention herein presented contemplates a variety of structural embodiments characterized by a resiliently biased, snap-acting, over-center actuating mechanism.

In describing the invention, reference will be made to these presently preferred embodiments by way of example and with reference to appended drawings. However, it will be understood that the reference to preferred embodiments will be by way of example only and not by way of restricting the scope of the present invention.

DRAWINGS

Figure 2:
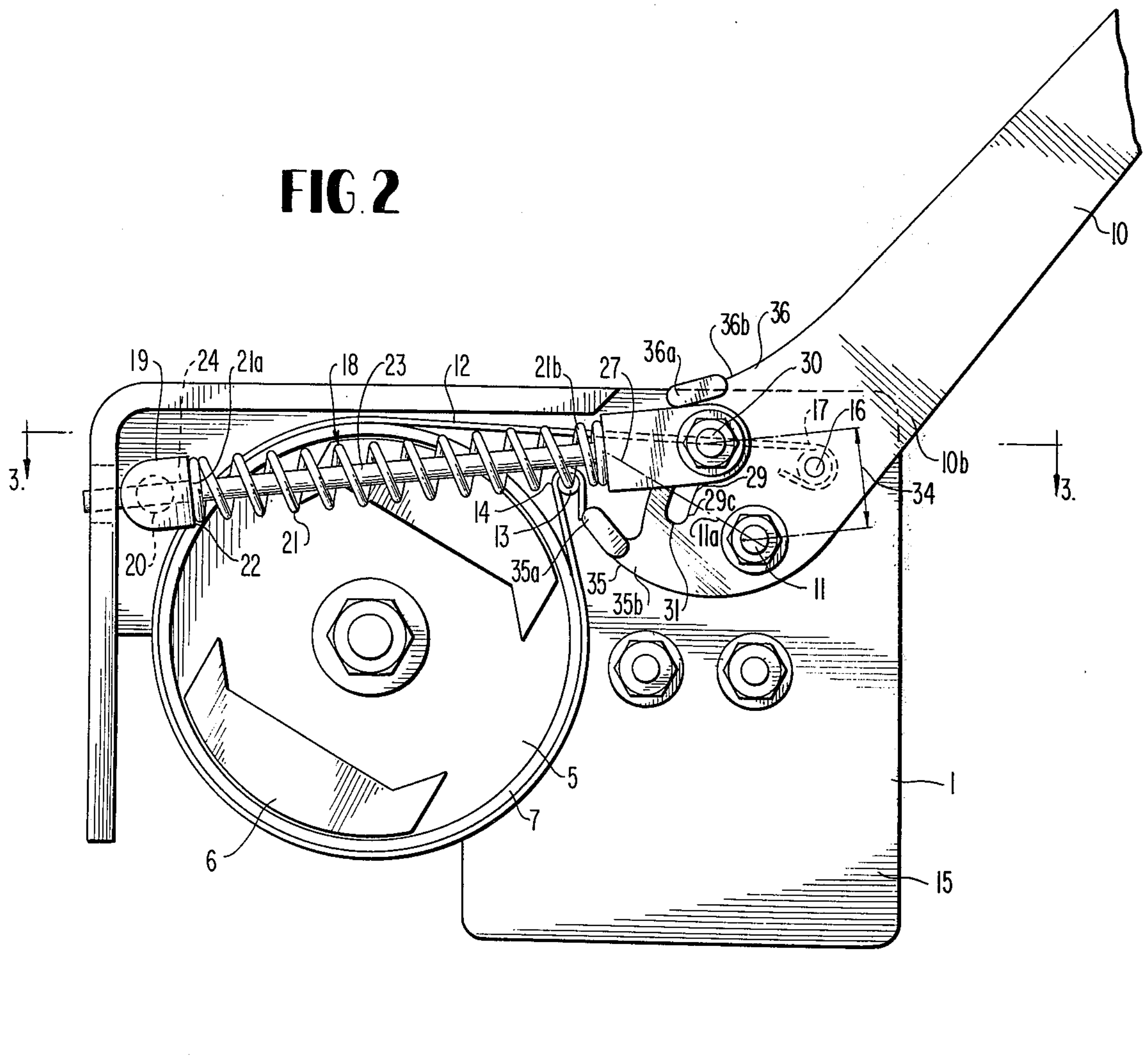
Figure 3:
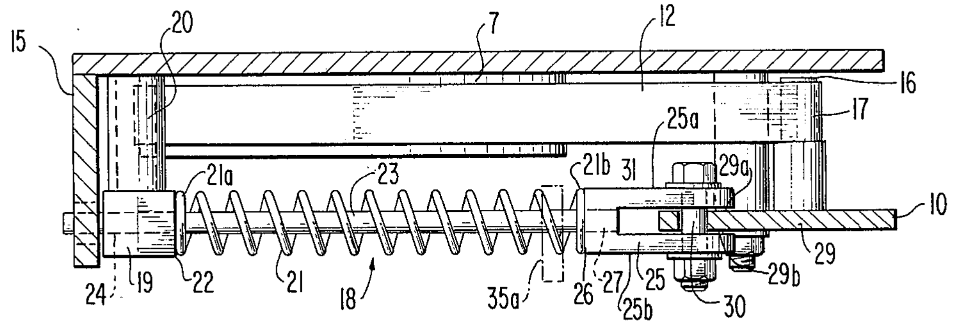
Figure 4:
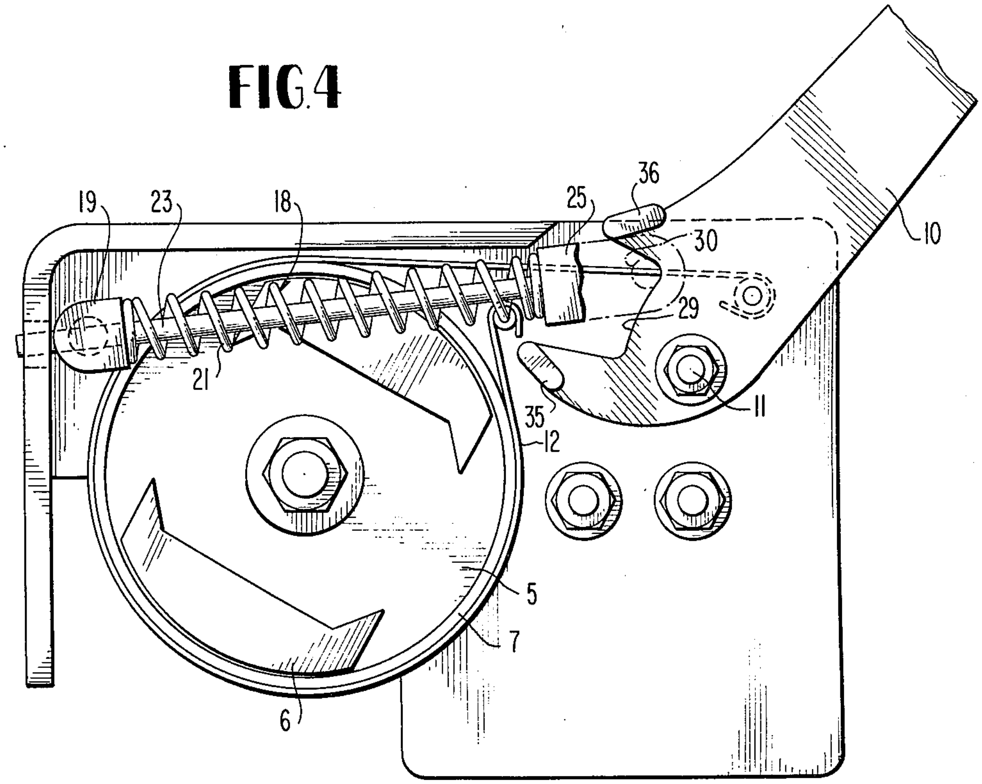

Presently preferred embodiments of the invention are illustrated in the appended drawings. In these drawings FIG. 1 provides a fragmentary, partial elevational view of that portion of a chain saw immediately associated with the safety brake mechanism of the present invention and showing the chain saw in a non-braked condition;

FIG. 2 provides an enlarged fragmentary elevational view of the safety brake mechanism featured in FIG. 1, but illustrating the chain saw in a braked condition;

FIG. 3 provides a sectional view of the FIG. 1 safety mechanism as viewed along the section line 3—3 of the FIG. 2, brake actuated condition;

FIG. 4 schematically illustrates a somewhat modified form of the safety brake mechanism which is illlustrated in FIGS. 1 – 3, illustrating the modified form in an acutated or braked condition;

FIG. 5 provides a fragmentary, elevational view of a chain saw portion, generally related to that shown in FIG. 2, but depicting a still further alternative format of the present chain saw braking concept, with this alternative structure being depicted in a non-braking condition;

FIG. 6 provides a sectional view of the FIG. 5 embodiment as viewed along section line 6—6 of FIG. 5; and FIG. 7 depicts the FIG. 5 safety brake in the context of the chain saw portion as generally shown in FIG. 1, depicting this format somewhat schematically, illustrating a chain saw centrifugal clutch different than that incorporated in FIG. 1, and depicting the FIG. 5 chain saw in an actuated or braked condition.

With the content of the drawings having been generally described, it now becomes appropriate to consider individual structural details of the invention.

GENERAL DESCRIPTION OF INVENTION

In describing the chain saw safety brake of the present invention, reference will first be made to exemplary embodiments, showing by way of example only, representative chain saws and chain saw drive mechanisms with which the present invention is intended to be practiced.

Overall Chain Saw Structure

FIGS. 1 and 7 each illustrate representative chain saw structures with which the present invention is intended to be practiced.

FIG. 1 depicts a chain saw 1 generally as shown in Frederickson U.S. Pat. No. 3,542,095, issued Nov. 24, 1970, the disclosure of which is herein incorporated by reference. Chain saw 1 includes chain saw engine means 2 and chain saw cutter chain means 3.

Chain saw 1 further includes chain saw driving means 4 which is operable to provide a driving connection between the chain saw engine means 2 and the chain saw cutter means 3.

The chain saw driving means 4 may include a centrifugal clutch 5, generally as depicted in Collins U.S. Pat. No. 3,385,411 issued May 28, 1968, the disclosure of which is herein incorporated by reference.

Clutch 5 includes centrifugally responsive, clutch shoe means 6 operable to be driven by the engine means 2, and clutch drum means 7 drivingly connected with the chain saw cutter chain 5 means and operable to be centrifugally engaged by the clutch shoe means 6.

Saw 1 additionally includes chain saw hand grip means 8 which may be generally like the hand grip means featured in Frederickson U.S. Pat. No. 3,542,095 or modified somewhat, as shown in FIG. 1, to omit side portion 39 of the Frederickson handle.

The FIG. 7 chain saw corresponds generally to that shown in FIG. 1 and its basic components have been assigned reference numerals equivalent to those of FIG. 1, but increased by 100.

However, by way of example, it will be noted that the FIG. 7 chain saw 101 may include a hand grip means 108 corresponding generally to that generally depicted in Loop U.S. Pat. No. 3,678,973, the disclosure of which is herein incorporated by reference.

Moreover, chain saw 101 may include a centrifugal clutch 105 generally as shown in Frederickson U.S. Pat. No. 3,768,611, the disclosure of which is herein incorporated by reference.

For definitional purposes, the term "chain saw" will be used to define a chain saw structure independent of the chain saw safety brake of the present invention.

With the chain saw context of the invention having been discussed, by way of example only, it now becomes appropriate to consider structural and method aspects of the present safety brake invention.

Chain Saw Safety Brake — First Embodiment

A first preferred embodiment of the invention is illustrated in FIGS. 1 through 3.

As shown in FIGS. 1 to 3, chain saw 1 is associated with a chain saw safety brake 9.

Brake 9 includes safety handle means 10, generally as depicted in Dooley U.S. Pat. No. 3,839,795 issued Oct. 8, 1974, the disclosure of which is herein incorporated by reference.

Safety handle means 10 is operable to be engaged at transverse portion 10*a* by movement of a chain saw operator's hand away from the chain saw hand grip means 8 during a kickback or when the operator's hand slips off of hand grip 8 and moves toward cutter chain 3.

A pivot means 11 pivotally supports the safety handle means 9 on the chain saw 1.

Brake 9 includes a brake band means 12 which at least partially encircles clutch drum means 7 as shown in FIG. 1. Band 12, which may be fabricated of a spring steel band, is operable to be disposed in

- a first, relatively expanded, brake band condition shown in FIG. 1 permitting chain driving rotary movement of the clutch drum 7, and
- a second, relatively constricted, brake band condition shown in FIG. 2 engaging and substantially preventing movement of the clutch drum 7.

An anchor means or pin mounting 13 is connected with one hooked end 14 of the brake band 12 and secures this one end 14 of the brake band to the engine housing 15 of the chain saw 1.

A connecting means or other pin mounting 16 secures another end 17 of the brake band 12 to a portion 10*b* of the safety handle 10, which portion 10*b* is spaced from the safety handle pivot 11*a*. With this arrangement, movement of the safety handle 10 away from the hand grip means 8, and the first safety handle means position depicted in FIG. 1 providing the first, relatively expanded brake band condition, will move the connecting means 16 relative to the anchor 13 means and position the safety handle 10 at a second safety handle means position depicted in FIG. 2 so as to constrict or tighten the brake band 12 about clutch drum 7 and dispose the brake band 12 in a second, relatively constricted, condition shown in FIG. 2.

Brake means 9 further includes a resilient biasing means 18 comprising

- a first, block-like mounting means 19 which is pivotally secured by pivot mount 20 to the engine housing 15 of chain saw 1,
- a coil spring 21 which has one end 21a which engages one end 22 of the first mounting means 19,
- a guide rod 23 which extends telescopingly through the coil spring 21 and a passage 24 of the first mounting means 19, and
- a second, clevis-like mounting means 25 biasingly engaged at end 26 by another end 21b of the coil spring 21 and connected with the guide rod 23 by rod connection 27.

An over-center connecting means 28 operably interconnects the biasing means 18 and the safety handle 10 and includes

- a cam surface 29 carried by the safety handle 10 and extending transversley of a radius 11a of the safety handle pivot 11 on opposite sides of this radius, and
- a rod-like, bearing or cam follower means 30 carried by the legs 25*a* and 25*b* of the second mounting means 25 and disposed in sliding engagement with the cam surface 29, with the coil spring 21 biasingly urging the cam follower 30 into sliding engagement with the cam surface 30 and the legs 25*a* and 25*b* being movably disposed adjacent opposite edges 29*a* and 29*b* of the cam surface 29.

As shown in FIG. 2, the cam surface 29 may comprise a somewhat convex surface carried by the safety handle 10, disposed in alignment with a plane extending longitudinally of the chain saw 1, and curving about pivot axis 11.

As is further shown in FIG. 2, the safety brake additionally includes a cam follower retaining means 31 which cooperates with the cam surface 29 to define a movement restricting enclosure, or slot 32 constraining said cam follower 30.

The cam follower 30, when engaged with a first portion 29c of the cam surface 29 depicted in FIG. 2 which is located on one side of the radius 11*a*, as shown in FIG. 1, is operable to resiliently bias the safety handle 10 towards the hand grip 8 and the first safety handle means position effecting the first, relatively expanded condition of said brake band means. In this "cocked" condition, the chain saw brake is disposed for normal chain saw operation.

The cam follower 30, when engaged with a second portion 29*d* depicted in FIG. 1 of the cam surface 29 on another side of the radius 11*a*, as shown in FIG. 2, is operable to resiliently bias the safety handle 10 toward the second safety handle means position effecting the second, relatively constricted condition of said brake band means. In this condition, effected by an operator's hand leaving grip 8 and engaging handle portion 10*a* so as to push handle 10 toward the cutter chain 3, the clutch drum 7 and cutter chain 3 are braked.

As will now be appreciated, the cooperation between braking means 18 and safety handle 10 affords a resiliently biased, snap-acting, over-center mode of movement of handle 10 between the FIG. 1 "cocked" and FIG. 2 "braked" positions and vice versa.

The biasing means 18 cooperates with the safety handle 10, in the first, safety handle means position of engagement between said cam follower 30 and the cam surface means 29 shown in FIG. 1, to provide a relatively shorter lever arm 33 through which the biasing means 18 acts resiliently on the safety handle 10 to resiliently bias this safety handle 10 toward the hand grip 8 and the first, safety handle means position of FIG. 1. This means that "recocking" of the safety handle 10 from the FIG. 2 to the FIG. 1 position may be relatively easily effected.

The biasing means 18 cooperates with the safety handle 10, in the second, safety handle means position of engagement between said cam follower 30 and the cam surface 29, to provide a relatively longer lever arm 34 through which the biasing means 18 acts resiliently on the safety handle 10 to resiliently bias this safety handle 10 away from the hand grip 8 and toward the second, safety handle means position of FIG. 2. This means that an intensified brake setting force will result when an operator's hand moves handle 10 to the brake setting position of FIG. 2.

A first, accelerator lever means 35 is carried by the safety handle 10 and comprises a lug-like plate **35*a* carried by lever arm 35*b* as to be engageable with the top side of clevis 25. Plate 35*a* may have a width straddling clevis 25, as shown in phantom line in FIG. 3. Lever 35 is disposed on the top side of radius 11*a* and the second mounting means or clevis 25 and is operable to engage the top side of clevis 25 at a location spaced radially outward from the cam follower 30 in relation to pivot axis 11. The first accelerator lever means 35 is thus operable to induce clockwise movement of the cam follower 30 (as shown in FIG. 1) relative to the cam surface 29, toward said second portion 29*d* of the cam surface 29 in response to clockwise pivoting movement (as shown in the drawings) of the safety handle 10 toward the second safety handle means position of FIG. 2 at a faster rate than would result only or merely from direct sliding engagement of the cam follower 30 and the cam surface 29 during such pivoting movement. This means that an accelerated, over-center, snap-acting cooperation between biasing means 18 and actuating handle 10 will occur when an operator's hand pushes on handle portion 10*a* and effect very rapid brake setting movement of handle 10** with less handle movement than would be otherwise required.

A second, accelerator lever means 36 is carried by the safety handle 10 and includes a clevis engaging plate **36*a* and a lever arm 36*b* essentially like those of lever means 35. However, lever 36 is disposed on the bottom side of the radius 11 and the second mounting means or clevis 25 is operable to engage the bottom side of the clevis 25 at a location spaced radially outward from the cam follower 30, in relation to pivot 11. The second accelerator lever 36 is operable to induce counterclockwise movement of cam follower 30 (as shown in FIG. 2) relative to the cam surface 29 toward the first portion 29*c* of the cam surface 29 in response to counterclockwise, handle recocking, pivoting movement of safety handle 10 toward the first safety handle means position of FIG. 1 at a faster rate than would result only or merely from direct engagement of the cam follower 30 and the cam surface 29 during such pivoting, recocking movement. This means that an accelerated recocking of handle 10 may be effected, with counterclockwise recocking force being exerted on handle 10** for a shorter increment of handle movement than would otherwise be required.

Chain Saw Safety Brake — Second Embodiment

A second embodiment of the chain saw safety brake of the present invention comprising a somewhat modified form of the FIGS. 1 – 3 embodiment is illustrated in FIG. 4.

The FIG. 4 embodiment is substantially identical to the FIGS. 1 – 3 embodiment except that the retaining means 31 is omitted. In other words, cam surface 29 is "open" rather than "enclosed".

Chain Saw Safety Brake — Third Embodiment

The first and second chain saw safety brake embodiments were characterized by arrangements where the actuating cam surface is carried by the safety handle and the first mounting means 19 of the biasing means 18 is connected with the chain saw engine housing 15. In these embodiments, the biasing means may extend along the side of the chain saw, generally across the chain saw centrifugal clutch 5, as depicted in FIGS. 1 through 4.

In a third embodiment of the present invention, depicted generally in FIGS. 5 – 7, the biasing means extends upwardly generally along the chain saw hand grip means and the safety handle. In this third embodiment, the cam surface means is mounted on the engine housing while the first mounting means of the biasing means is carried by the safety handle.

As will be recalled, components of the FIGS. 5 – 7 embodiment are identified by reference numerals corresponding to equivalent components of the FIGS. 1 – 4 embodiments, increased by 100.

Inasmuch as the mode of cooperation between the components of the FIGS. 5 – 7 embodiment is substantially the same as the mode of cooperation between the FIGS. 1 – 4 embodiment's components, and this is self-evident from the drawings, it is not deemed necessary to reiterate structural details in relation to FIGS. 5 – 7.

Suffice it to say that in FIGS. 5 – 7, the cam surface 29 is carried by the engine housing 115 of chain saw 101 and the first mounting means 119 is pivotally secured by pivot 120 to safety handle 110.

Moreover, instead of the accelerating lever means 135 and 136 being disposed above and below the clevis 125 as in the case of the disposition of elements 35, 36 and 25, lever means 135 is disposed to the right side of clevis 125, with lever means 136 being disposed on the left side, as illustrated in FIGS. 5 – 7.

It might also be noted that the extremity of the "cocked" position of handle 10, as depicted in FIG. 1, may be determined by the biasing force of spring 21 or by engagement of handle 10 with suitable stop means carried by the chain saw body or hand grip means. In the FIGS. 5 – 7 embodiment, this cocked position extremity is defined by engagement of handle 110 with hand grip 108, as depicted in FIGS. 5 and 6.

Summary of Actuation Characteristics

As will now be apparent, this invention is concerned with a method of safety-braking a chain saw, wherein the chain saw includes brake means and brake actuating means movably engaged with said brake means.

Characterizing features of the invention involve:

operably interposing actuation accelerator means, such as the described accelerating lever means, between the brake actuating means and the brake means and employing such accelerator means to effect a faster rate of brake actuation than would result from said movable engagement between said brake actuating means and said brake means alone;

biasing the brake actuating means toward a nonactuating position with a relatively lower biasing force; and biasing the brake actuating means toward an actuating position with a relatively higher biasing force.

The invention is also independently characterized by an over-center, snap-acting, cocking and braking mechanism.

SUMMARY OF MAJOR ADVANTAGES AND GENERAL SCOPE OF INVENTION

The resiliently biased, snap-acting, over-center actuating mechanism described in connection with each of the three embodiments set forth in this application produces several unique advantages.

In the first instance, it will be noted that the lever means associated with the cam surface means causes the cam follower means to translate along the cam surface means faster than this movement would occur if the lever means were not present. This insures unusually rapid or accelerated brake setting when the safety handle is tripped or engaged by an operator's hand and further insures brake actuating and handle cocking movement in response to relatively short increments of movement of the safety handle.

Moreover, the unique, over-center character of the actuating mechanism produces a longer lever arm through which biasing force is exerted on the safety handle when the handle is moved toward the brake actuating position. This phenomenon produces an intensified braking force. The intensified braking force in conjunction with the accelerated braking action is believed to materially improve the rapidity and efficiency of stopping of the cutter chain of the chain saw so as to enhance overall safety conditions.

Independent of these particular and significant advantages, it is believed that the structural arrangements heretofore described are also characterized by unique simplicity, ruggedness, and reliability. It will also be appreciated that these arrangements enable safety brake mechanisms to be installed with minimal modification of conventional chain saw structures and without interfereing with conventional drive chain arrangements.

Proposals have been heretofore offered which have significantly advanced the state of chain saw safety. These proposals are disclosed in Moore United States application Ser. No. 109,574, now U.S. Pat. No. 3,739,475, issued June 19, 1973; Moore United States application Ser. No. 294,866, now U.S. Pat. No. 3,793,727, issued Feb. 26, 1974; and Dooley United States application Ser. No. 354,776, now U.S. Pat. No. 3,839,795, issued Oct. 8, 1974, all assigned to the assignee of the present invention.

Other chain saw safety proposals have been proferred as can be seen, for example, in Gustafsson U.S. Pat. No. 3,776,331, issued Dec. 4, 1973; Mattsson et al. U.S. Pat. No. 3,664,390, issued May 23, 1972; Irgens U.S. Pat. No. 3,361,165, issued Jan. 2, 1965; Kiekhaefer U.S. Pat. No. 2,610,657, issued Sept. 16, 1952; and British Pat. No. 1,351,546, published May 1, 1974.

These prior art concepts notwithstanding, the accelerated and intensified braking characteristics of the present invention are considered to constitute a novel, unobvious, and advantageous advance in the chain saw art.

Those skilled in the chain saw art and familiar with the present disclosure may well envision alternative arrangements in addition to those described and will recognize that the invention may be practiced in a variety of structural formats and in connection with a substantial variety of chain saws and chain saw drive mechanisms and chain saw brake mechanisms, in addition to those illustrated. In short, while additions, deletions, substitutions or modifications in relation to the disclosed embodiments may be effective in practicing the invention, such changes would be deemed to fall within the purview of the present invention to the extent encompassed by the appended claims.

What is claimed is:

1. In a chain saw including chain saw engine means;

chain saw cutter chain means;

chain saw driving means operable to provide a driving connection between said chain saw engine means and said chain saw cutter means, said chain saw driving means including centrifugally responsive, clutch shoe means operable to be driven by said engine means, and clutch drum means drivingly connected with said cutter chain means and operable to be centrifugally engaged by said clutch shoe means; and chain saw hand grip means;

the improvement entailing a chain saw safety brake comprising:

safety handle means operable to be engaged by movement of a chain saw operator's hand away from said chain saw hand grip means;

pivot means pivotally supporting said safety handle means on said chain saw;

brake band means at least partially encircling clutch drum means and operable to be disposed in a first, relatively expanded, brake band condition permitting movement of said clutch drum means, and a second, relatively constricted, brake band condition engaging and substantially preventing movement of said clutch drum means;

anchor means connected with one end of said brake band means and securing said one end of said brake band means to said chain saw;

connecting means securing another end of said brake band means to a portion of said safety handle means, spaced from said pivot means, such that movement of said safety handle means away from said hand grip means and a first safety handle means position providing said first, relatively expanded brake band condition will move said connecting means relative to said anchor means and position said safety handle means at a second safety handle means position so as to constrict said brake band means and dispose said brake band means in said second, relatively constricted, condition;

biasing means comprising first mounting means secured to one of said chain saw and said safety handle means coil spring means engaging one end of said first mounting means, guide rod means extending telescopingly through said coil spring means and said first mounting means, and second mounting means biasingly engaging another end of said coil spring means and connected with said guide rod means;

over-center connecting means operably interconnecting said biasing means and said safety handle means and including cam surface means carried by the other of said safety handle means and said chain saw and extending transversely of a radius of said safety handle pivot means on opposite sides of said radius, cam follower means carried by said second mounting means and disposed in sliding engagement with said cam surface means, with said coil spring means biasingly urging said cam follower means into said sliding engagement with said cam surface means, said cam follower means, when engaged with a first portion of said cam surface means on one side of said radius being operable to resiliently bias said safety handle means towards said hand grip means and said first safety handle means position, effecting said first, relatively expanded condition of said brake band means, said cam follower means, when engaged with a second portion of said cam surface means on another side of said radius, being operable to resiliently bias said safety handle means toward said second safety handle means position effecting said second, relatively constricted condition of said brake band means, said biasing means cooperating with said safety handle means, in said first, safety handle means position of engagement between said cam follower means and said cam surface means, to provide a relatively shorter lever arm through which said biasing means acts resiliently on said safety handle means to resiliently bias said safety handle means toward said hand grip means and said first, safety handle means position, said biasing means cooperating with said safety handle means, in said second, safety handle means position of engagement between said cam follower means and said cam surface means, to provide a relatively longer lever arm through which said biasing means acts resiliently on said safety handle means to resiliently bias said safety handle means away from said hand grip means and toward said second, safety handle means position, first, accelerator lever means carried by said other of said safety handle means and said chain saw, disposed on one side of said radius and said second mounting means, and operable to engage said one side of said second mounting means at a location spaced from said cam follower means, said first accelerator lever means being operable to induce movement of said cam follower means relative to said cam surface means toward said second portion of said cam surface means in response to pivoting movement of said safety handle means toward said second safety handle means position at a faster rate than would result only from direct sliding engagement of said cam follower means and said cam surface means during such pivoting movement, and second accelerator lever means carried by said one of said safety handle means and said chain saw, disposed on another side of said radius and said second mounting means and operable to engage said other side of said second mounting means at a location spaced from said cam follower means, said second accelerator lever means being operable to induce movement of said cam follower means relative to said cam surface means toward said first portion of said cam surface means in response to pivoting movement of said safety handle means toward said first safety handle means position at a faster rate than would result only from direct engagement of said cam follower means and said cam surface means during such pivoting movement.

2. A chain saw as described in claim 1 wherein:

said cam surface means comprises surface means carried by said safety handle means;

said first mounting means is pivotally secured to a portion of said chain saw which is connected with said chain saw engine means;

said second mounting means comprises clevis means having spaced leg means movably disposed adjacent opposite edges of said cam surface means;

said cam follower means comprises bearing means supported between said leg means of said clevis means; and said apparatus additionally includes cam follower retaining means cooperating with said cam surface means to define a movement restricting enclosure, constraining said cam follower means.

3. A chain saw as described in claim 1 wherein:

said cam surface means comprises surface means carried by said safety handle means;

said first mounting means is pivotally secured to a portion of said chain saw which is connected with said chain saw engine means;

said second mounting means comprises clevis means having spaced leg means movably disposed adjacent opposite edges of said cam surface means; and said cam follower means comprises bearing means supported between said leg means of said clevis means.

4. A chain saw as described in claim 1 wherein:

said cam surface means comprises surface means carried by said chain saw;

said first mounting means is pivotally secured to said safety handle means;

said second mounting means comprises clevis means having spaced leg means movably disposed adjacent opposite edges of said cam surface means; and said cam follower means comprises bearing means supported between said leg means of said clevis means.

5. In a chain saw including chain saw engine means;

chain saw cutter chain means; and chain saw driving means operable to provide a driving connection between said chain saw engine means and said chain saw cutter means; and chain saw hand grip means;

the improvement entailing a chain saw safety brake comprising:

safety handle means operable to be engaged by movement of a chain saw operator's hand away from said chain saw hand grip means;

pivot means pivotally supporting said safety handle means on said chain saw;

brake means operable to be disposed in a first brake condition permitting movement of said chain saw cutter chain means, and a second brake condition substantially preventing movement of said chain saw cutter chain means;

biasing means;

over-center connecting means operably interconnecting said biasing means and said safety handle means and including cam surface means carried by one of said safety handle means and said chain saw and extending transversely of a radius of said safety handle pivot means on opposite sides of said radius, cam follower means carried by the other of said safety handle means and said chain saw and disposed in sliding engagement with said cam surface means, with said biasing means biasingly urging said cam follower means into said sliding engagement with said cam surface means, said cam follower means, when engaged with a first portion of said cam surface means on one side of said radius being operable to resiliently bias said safety handle means towards said hand grip means and said first safety handle means position effecting said first, movement permitting condition of said brake means, said cam follower means, when engaged with a second portion of said cam surface means on another side of said radius, being operable to resiliently bias said safety handle means toward said second safety handle means position effecting said second, movement preventing condition of said brake means, said biasing means cooperating with said safety handle means, in said first, safety handle means position of engagement between said cam follower means and said cam surface means, to provide a relatively shorter lever arm through which said biasing means acts resiliently on said safety handle means to resiliently bias said safety handle means toward said hand grip means and said first, safety handle means position, said biasing means cooperating with said safety handle means, in said second, safety handle means position of engagement between said cam follower means and said cam surface means, to provide a relatively longer lever arm through which said biasing means acts resiliently on said safety handle means to resiliently bias said safety handle means away from said hand grip means and toward said second, safety handle means position, and accelerator lever means carried by said one of said safety handle means and said chain saw, disposed on one side of said radius, and operable to exert movement inducing force on cam follower means at a location spaced from said cam follower means, said accelerator lever means being operable to induce movement of said cam follower means relative to said cam surface means toward said second portion of said cam surface means in response to pivoting movement of said safety handle means toward said second safety handle means position at a faster rate than would result only from direct sliding engagement of said cam follower means and said cam surface means during such pivoting movement.

6. A chain saw as described in claim 5 wherein:

said cam surface means comprises surface means carried by said safety handle means;

said first mounting means is pivotally secured to a portion of said chain saw which is connected with said chain saw engine means;

said second mounting means comprises clevis means having spaced leg means movably disposed adjacent opposite edges of said cam surface means;

said cam follower means comprises bearing means supported between said leg means of said clevis means; and said apparatus additionally includes cam follower retaining means cooperating with said cam surface means to define a movement restricting enclosure, constraining said cam follower means.

7. A chain saw as described in claim 5 wherein:

said cam surface means comprises surface means carried by said safety handle means;

said first mounting means is pivotally secured to a portion of said chain saw which is connected with said chain saw engine means;

said second mounting means comprises clevis means having spaced leg means movably disposed adjacent opposite edges of said cam surface means; and said cam follower means comprises bearing means supported between said leg means of said clevis means.

8. A chain saw as described in claim 5 wherein:

said cam surface means comprises surface means carried by said chain saw;

said first mounting means is pivotally secured to said safety handle means;

said second mounting means comprises clevis means having spaced leg means movably disposed adjacent opposite edges of said cam surface means; and said cam follower means comprises bearing means supported between said leg means of said clevis means.

* * * * *